United States Patent [19]

Uddin

[11] Patent Number: 5,038,742
[45] Date of Patent: Aug. 13, 1991

[54] VAPORIZER NOZZLE

[75] Inventor: Mustafa A. Uddin, Bradford, England

[73] Assignee: E-Tech Limited, Bradford, England

[21] Appl. No.: 488,056

[22] PCT Filed: Oct. 13, 1989

[86] PCT No.: PCT/GB89/01219
§ 371 Date: Jul. 2, 1990
§ 102(e) Date: Jul. 2, 1990

[87] PCT Pub. No.: WO90/04095
PCT Pub. Date: Apr. 19, 1990

[30] Foreign Application Priority Data

Oct. 14, 1988 [GB] United Kingdom ............. 8824114

[51] Int. Cl.$^5$ ............................................. F02M 31/00
[52] U.S. Cl. ........................................ 123/549; 123/590; 123/545; 123/552; 123/540; 261/142
[58] Field of Search ............... 123/590, 549, 552, 543, 123/545, 547, 557; 261/142

[56] References Cited

U.S. PATENT DOCUMENTS

| | | | |
|---|---|---|---|
| 3,828,736 | 8/1974 | Koch | 123/545 |
| 4,088,104 | 5/1978 | Ibbott | 123/590 |
| 4,212,275 | 7/1980 | Inoue | 123/549 |
| 4,336,783 | 6/1982 | Henson | 123/557 |
| 4,742,314 | 5/1988 | Desage | 261/142 |
| 4,848,302 | 7/1989 | Firey | 123/549 |
| 4,849,604 | 7/1989 | Woolcott | 123/549 |

Primary Examiner—Andrew M. Dolinar
Assistant Examiner—M. Macy
Attorney, Agent, or Firm—Reising, Ethington, Barnard, Perry & Milton

[57] ABSTRACT

A vaporizing nozzle which comprises a wall (16) of porous material through which a liquid to be evaporated percolates from one side thereof into a gas stream at the other side thereof and a thermoelectric device (30) located at or adjacent the wall of porous material whereby to regulate the temperature thereof. A computer is provided, with a read only memory (ROM) or equivalent containing a "map" of the air to fuel ratio required for given values of the various parameters and compares the sensed values with the map held in memory and sends an appropriate signal to thermoelectric device controller which responds by sending a current of the correct magnitude and polarity to the device such that the device, which is in close proximity to the wall heats or cools the surface of the wall to a desired level thus regulating the flow or fuel therethrough.

13 Claims, 3 Drawing Sheets

VAPORIZER NOZZLE

This invention relates to a vaporiser nozzle and in particular relates to a vaporiser nozzle useful in evaporating liquids into gaseous streams for example liquid fuels into an air stream.

In internal combustion engines, turbines, liquid fuel fired furnaces, and the like, liquid fuel is mixed with an oxidising gas stream, for example an air stream. In a conventional fuel/air mixing device such as a carburettor the fuel discharges from a jet or metering bar in a stream which is torn apart into ligaments which progressively break up and contract into droplets of various sizes. During this process vaporisation takes place and the droplets progressively reduce in size, the finest vaporising completely. Ideally, all of the liquid droplets would be vaporised and uniformly distributed in the air stream by the time they reach the combustion zone or combustion chamber.

In practice, especially under the varying conditions which internal combustion engines in particular are subjected to, some of the droplets are incompletely vaporised and this has adverse effects on both fuel economy and the cleanliness of the exhaust gases. In most conventional devices such as carburettors complete vaporisation only occurs at some part throttle conditions. Furthermore vaporisation occurs at a substantial distance away from the point of fuel discharge which distance varies with variable fuel demands of the engine. Fuel vaporisation is improved with forced fuel injection systems where the fuel injection nozzle functions to mechanically atomise the fuel at the tip exposed to the air stream. Fuel injection has several advantages over conventional carburettors but suffers from the disadvantages of high manufacturing costs and additional complexity requiring more sophisticated servicing.

In our international patent application No. PCT/GB88/00508 (WO 89/00240) there is described a vaporising device including a nozzle which comprises a wall of porous material through which a liquid to be evaporated percolates from one side thereof in to a gas stream at the other side thereof. The porous material is a sintered metal, in particular brass, bronze, cupro-nickel or the like. Conveniently, the wall will be cylindrical in configuration and the gas stream may flow over the cylinder, in which case the liquid will be supplied internally of the cylinder, or may flow through the cylinder in which case the liquid will be supplied externally of the cylinder. The primary use of this nozzle is in mixing hydrocarbon fuels with an air stream, for use in for example an internal combustion engine.

The nozzle of our above mentioned PCT application is very efficient and thus at high rates of vaporisation it is subjected to considerable cooling. This, in turn, affects the density and viscosity of the fuel and can adversely affect fuel flow. Indeed, in our earlier patent publication it was recognised that heat may need to be supplied to help combat this effect.

We have now discovered that if heat is applied in a precisely controllable manner it may be employed actually to regulate the flow of fuel from the nozzle and thus provide a very simple and efficient engine management system.

According to the present invention there is provided a vaporising nozzle which comprises a wall of porous material through which a liquid to be evaporated percolates from one side thereof into a gas stream at the other side thereof characterised in that a thermoelectric device is located at or adjacent the wall of porous material whereby to regulate the temperature thereof.

A thermoelectric device is a solid state device operating on the Peltier effect. The latter is the discovery that the passage of an electrical current through a junction of two dissimilar conductors cools or heats the junction depending on the direction of the current. Thermoelectric devices operating on this principal are now commercially available. If a steady or pulsating DC current source is connected to such a device heat will be absorbed at one end of the device, cooling it, while heat is ejected at the other end where the temperature rises. Reversing the current flow reverses the direction of flow of heat. Thermoelectric devices can be made extremely small with current requirements ranging from a few milliamperes to tens of amperes and single thermoelectric devices can achieve temperature differentials of up to 70 deg.C. Furthermore such devices are capable of extremely accurate temperature control, typically to within plus or minus 0.1 deg.C.

The use of a thermoelectric device in conjunction with the nozzle substantially as described in our above mentioned PCT publication enables the temperature of the porous wall and immediate surrounding space to be controlled accurately, thereby affecting the viscosity and density of the fuel and regulating its rate of throughput through the wall. This regulation is imposed on the 'automatic' regulation achieved by throttle opening, that is an increase in air flow drawing an increasing amount of fuel through the nozzle. With the ability of a thermoelectric device either to heat or cool, a wide degree of control can be achieved even down to effectively 'freezing' the surface of the porous wall substantially completely preventing fuel from flowing.

Thermoelectric devices, being solid state devices, can be manufactured in a number of shapes and it is preferred that the device be manufactured in the shape of, for example, a cylinder, to surround the nozzle.

The use of the device of the invention allows 'fine tuning' of the air/fuel mixture ratio and, with the thermoelectric device being electrically operated, and having no mechanical or hydraulic moving parts, allowing the whole fuel management side to be operated electronically, e.g. under computer control, ensuring optimal mixture ratios for all conditions.

Preferably the device of the invention operates with one or more temperature sensors to help determine the correct setting for the thermoelectric device in any given conditions. Typically sensors may be provided in the air stream to measure ambient air temperature, within the engine, to measure engine operating temperature, on the porous wall of the nozzle, and optionally, in the exhaust to measure exhaust temperature. For a given engine the correct fuel ratio for the various conditions sensed can be worked out and recorded in the computer or microprocessor controlling the engine management system so that the latter can deliver the correct signal to the thermoelectric device thereby giving the desired air to fuel ratio for the conditions sensed. It is also entirely possible to have two different sets of conditions, one of which gives optimum performance and the other of which gives optimum economy, and allow the driver to select between the two settings. Additionally or alternatively, the settings may be chosen with engine emission control in mind so as to reduce the levels of toxic exhaust emissions. Where catalytic converters are used for the after treatment of harmful pollutants in the exhaust, the system of the invention may be used to ensure that accurate control of the air to fuel ratio is given over the entire range of vehicle operation for maximum conversion efficiencies. The response times of the thermoelectric devices employed in the invention are extremely quick and typically are much quicker than the response times in the mechanical and/hydraulic systems employed in fuel injection systems conventionally used.

The invention will be described further, by way of example, with reference to the accompanying drawings, in which.

Figure 1:
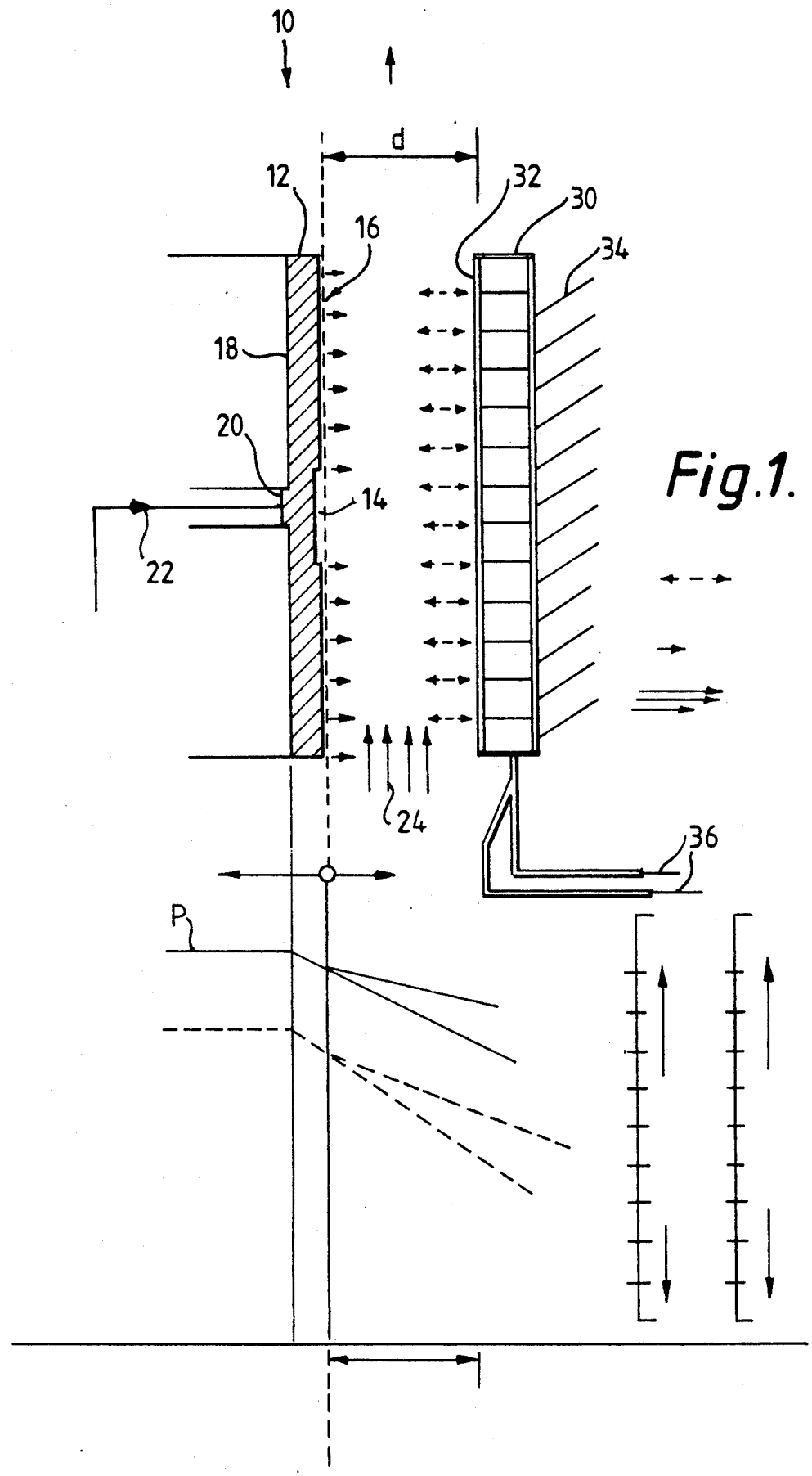
FIG. 1 is a diagrammatic sectional view through part of a device in accordance with the invention.

Referring to the drawings, a nozzle substantially as described in our above referred to PCT publication and generally designated 10 comprises a cylinder of sintered material such as bronze machined on its external surface at 14 employing a small depth of cut. The machining effectively closes the porous surface 14 leaving the surfaces 16 porous. Internally of the cylinder 12 portions 18 are machined leaving a central porous portion 20 to which fuel is supplied as illustrated diagrammatically at 22. The axial width of the portion 20 is calculated in relation to the internal diameter of the cylinder, the porosity of the material, and the fuel requirements so as to allow sufficient fuel to percolate through towards the outer wall surface 16.

It will be observed that the total surface area of the exit portions 16 is considerably greater than that of the fuel inlet portion 20 and this is illustrated diagrammatically in the lower portion of FIG. 1 in which the pressure drop 'p' is illustrated over the nozzle wall. The fuel is thus presented to a large porous surface in an air stream 24 and enters the air stream in the form of a multiplicity of extremely fine droplets which rapidly vaporise.

Figure 2:
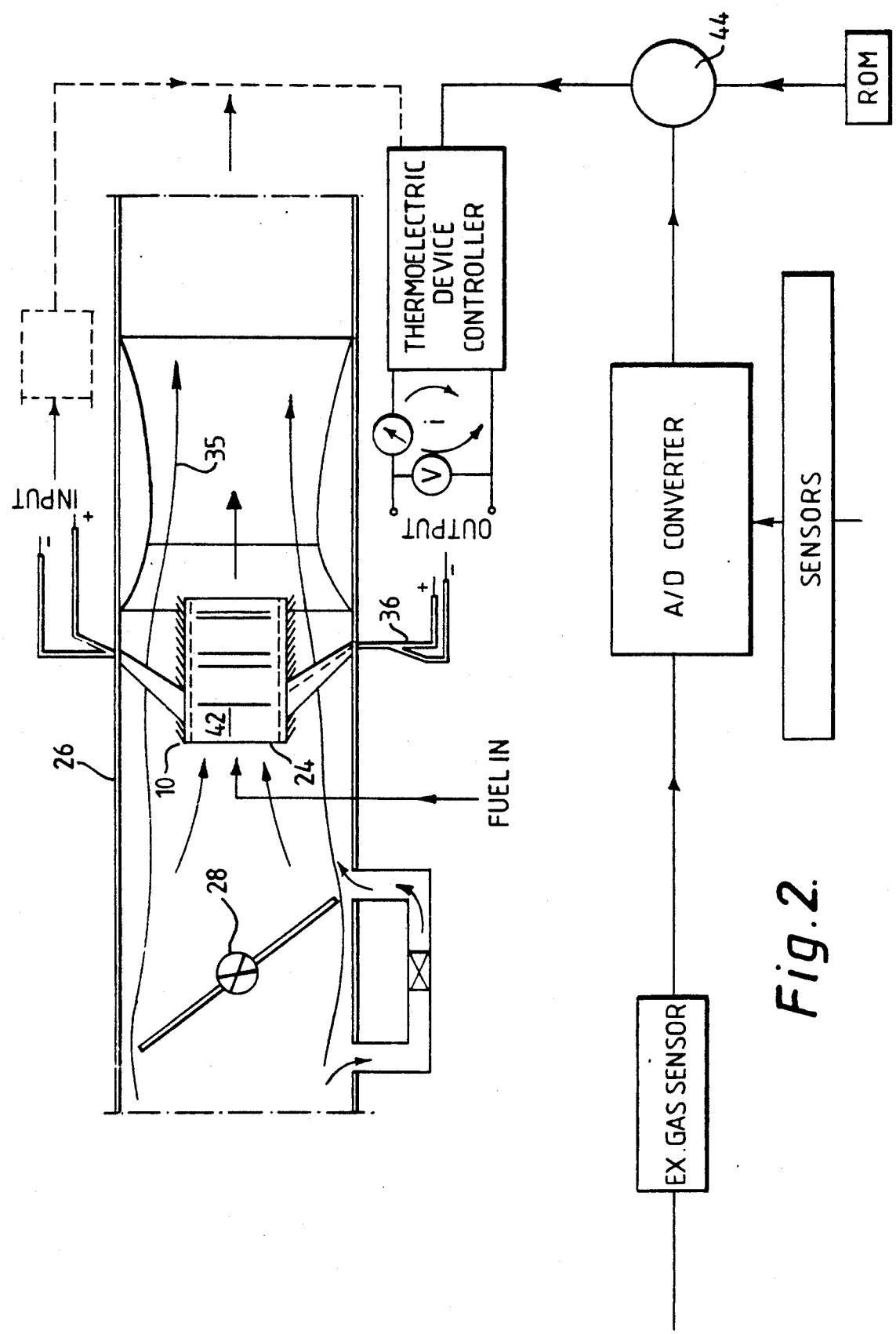
FIG. 2 is a diagrammatic sectional view of the device in position in an internal combustion engine inlet manifold.

In order to obtain the correct fuel/air ratio it is usually not necessary to pass the total air stream over the nozzle of the invention and a small proportion only of the air stream will normally be passed over the nozzle. The resultant rich air/fuel mixture will then be mixed with further air before before moving into the combustion zone. This is illustrated in FIG. 2 where the nozzle 10 is located within an inlet pipe 26 of an internal combustion engine having a butterfly throttle valve 28. As can be seen from FIG. 2 part only of the air stream passes within the nozzle body and the remainder by-passes it.

Figure 3A:
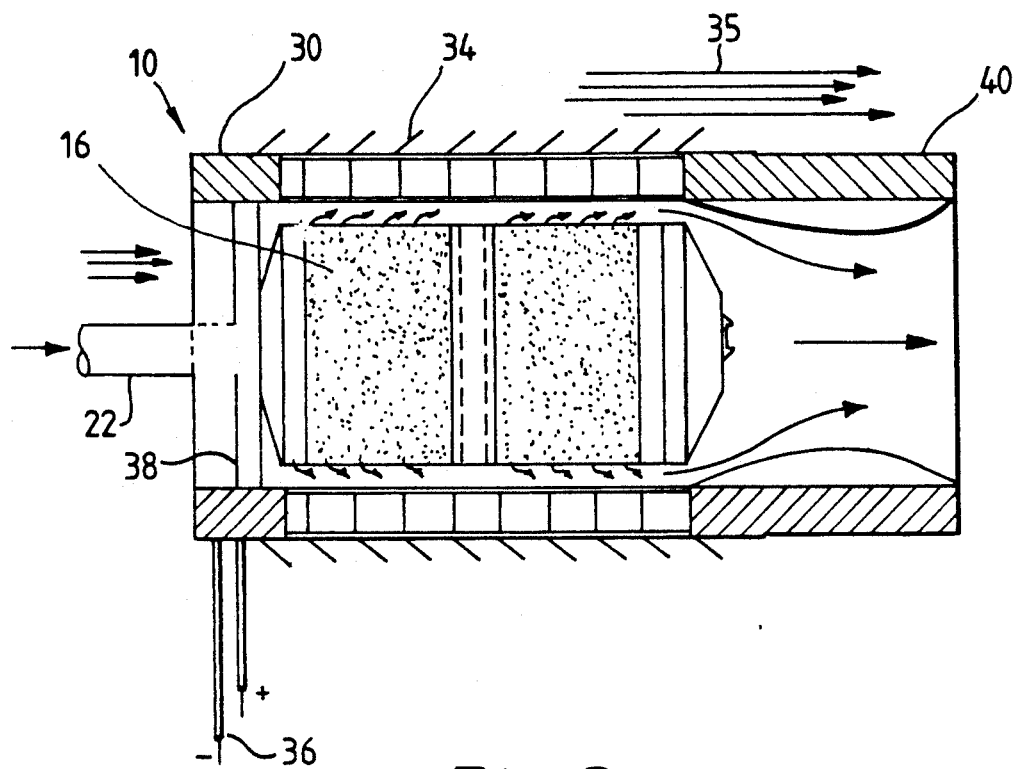
FIGS. 3a and b are respectively enlarged sectional and end views of the device shown in FIG. 2.
Figure 3B:
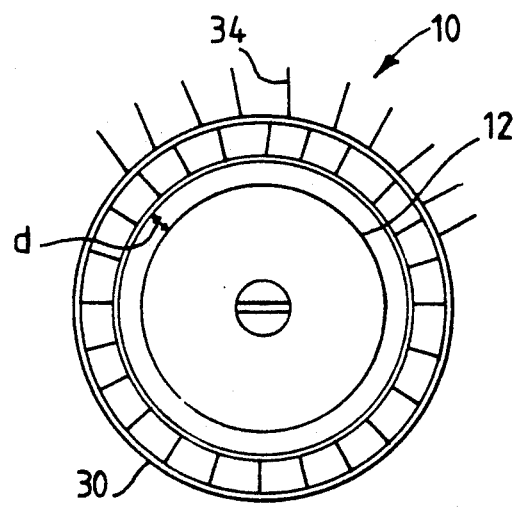

As can be seen from FIGS. 1 and 3, the cylindrical nozzle wall 12 is surrounded by one or more thermoelectric modules in the form of a concentric cylinder 30 leaving an air gap of width 'd'. The thermoelectric module 30 has an internal face 32 coextensive with and facing the porous portions 16 of the wall 12 while its outer face is connected to a heat exchange member in the shape of fins 34 which, as can be seen from FIG. 2, are located in the main air stream 35 and will therefore easily 'dump' or absorb heat from this air stream as required. The thermoelectric device 30 has electrical connections 36 which connect to an electronic engine management system indicated diagrammatically in FIG. 2.

The device as shown in FIG. 3a may be completed by means of a nozzle air control element 38 of selected porosity and an output discharge venturi 40.

In operation, air controlled by the butterfly valve 28 passes through the inlet pipe 26 and part of the air stream 24 passes through the annular gap d between the nozzle surface 12 and the thermoelectric cylinder 30. This air stream passes over the porous surfaces 16 and draws droplets of fuel therefrom. The temperature of this surface is sensed by means of a sensor 42, e.g. a thermocouple, and this information fed to the engine management processor 44. The central processor 44 receives imputs from other sensors, converted to digital form, of such paramaters as air intake temperature, engine temperature, throttle angle, road speed, automatic transmission shift status/demand, exhaust gas analyser, and the like. The central processor 44 is provided with a read only memory (ROM) or equivalent containing a 'map' of the air to fuel ratio required for given values of the various parameters. The processor 44 compares the sensed values with the map held in memory and sends an appropriate signal to the thermoelectric device controller which responds by sending a current of the correct magnitude and polarity to the device 30 such that the face 32, which is in close proximity to the faces 16, the gap d being very small, whereby to heat or cool the surfaces 16 to a desired level. When the desired level is reached, as determined by the thermocouple 42 the signal sent to the thermoelectric device 30 can be modified so as to maintain this level for as long as the engine conditions giving rise to it persist. As fuel is drawn from the surfaces 16 by the air flow it is cooled by the evaporation of fuel. This tends to increase the density and viscosity of the fuel percolating through the surface and thus slowing its supply. This effect can be enhanced by having the surface 32 cool the surfaces 16 even further—even to the point where the surfaces 16 'freeze' and fuel supply is cut off virtually completely. This condition would be desirable in overrun conditions of the engine. When acceleration is required, as detected first by wide throttle opening, the polarity of the current is reversed causing the surface 32 rapidly to heat up and heat the surface 16 causing greater fuel flow and aiding evaporation thereof for a given air flow.

The distance of separation d between the surfaces 16 and 32 influences the nozzle air stream velocity and is chosen experimentally to correspond with the particular grade of fuel used in a particular engine set up. The sensor 42 can monitor temperatures in the gap d as well as at the surface 16 and may be used to dampen out or smooth the response of the system to suppress hunting in the interests of good drivability and safe handling. The thermocouple can trigger the thermoelectric device switching (that is heating or cooling) around a desired value stored in the computer memory as discussed previously. 'Hunting' around the desired value should be kept to a minimum and the system is preferably biased towards the lean side of optimum in the interest of emission control.

While it is preferred to have an electronic control system particularly one employing a micro processor, other control systems may be used such as a combination of electromechanical and pure electronic systems in which case the thermoelectric device may well be controlled by such as a bridge circuit. The power requirements of the thermoelectric device used in the nozzle of the invention is well within the capabilities of the on board supply of the great majority of vehicles and in fact accounts for only a relatively small fraction of the total sytem loading. The sophistication of the system can be increased as desired to take account of such variations as fuel blend, altitude, engine aging due to wear and tear, and so forth. In the event of breakdown or malfunction of the thermoelectric device or its control system auxiliary heating means may be employed to heat the nozzle or the nozzle air to facilitate fuel discharge. A simple diverter valve could source nozzle air from the exhaust manifold thereby providing a 'get home' facility which while only allowing for limited engine operation in terms of speed/acceleration and load, would nevertheless allow the vehicle to be driven.

The system of the invention enables a complete electronic engine management system to be employed giving very precise control of the air/fuel ratio at all conceivable engine conditions and yet is simple in operation and economical, being considerably less complex than conventional fuel injection systems.

It has been found that sintered materials of various pore sizes are useful in the facts of the invention. Pore sizes of 2.5 and 5 micrometer have been found suitable for applications in which petrol is the fuel concerned whereas materials having a pore size of around 12.5 micrometers are more suitable for the heavier fuels such as diesel. Particularly for sintered materials with larger pore sizes, machining may not completely close off the porosity of the surface. In these circumstances it may be necessary to use additional sealing such as solder or chemical sealing compounds such as adhesives.

The nozzles of the invention can be used as a replacement for the jets in conventional carburettors but with their faster vaporisation characteristics they may advantageously be located closer to the combustion zones or engine cylinders. Thus one or more nozzles of the invention may advantageously be located adjacent the cylinder of a multicylinder internal combustion engine. In this configuration the nozzles of the invention give a similar performance to fuel injection systems but at a considerably lower cost. The fast vaporisation of the nozzle of the invention ensures easy starting of any internal combustion engine with which they are fitted and also more complete combustion lessening pollution products in the engine exhaust. The nozzles of the invention may also be used with advantage in other burning situations such as liquid fuel fired furnaces, turbines and the like including cryogenic applications for example in rockets.

I claim:

1. A vaporising nozzle which comprises a wall of porous material through which a liquid to be evaporated percolates from one side thereof into a gas stream at the other side thereof characterised in that a thermoelectric device is located adjacent the wall of porous material separated therefrom by a small gap whereby to regulate the temperature thereof.

2. A nozzle as claimed in claim 1 in which the device is manufactured in the shape of a cylinder, to surround the nozzle.

3. A nozzle as claimed in either of claims 1 or 2 in which the device is operated electronically under computer control.

4. A nozzle as claimed in claim 1 in which one or more temperature sensors are provided to help determine the correct setting for the thermoelectric device in any given conditions.

5. A nozzle as claimed in claim 4 in which sensors are provided in the air stream to measure ambient air temperature, within the engine, to measure engine operating temperature, on the porous wall of the nozzle, and in the exhaust to measure exhaust temperature.

6. A nozzle as claimed in claim 1 in which the porous material is a sintered metal.

7. A nozzle as claimed in claim 6 in which the metal is brass, bronze or cupro-nickel.

8. A nozzle as claimed in claim 1 in which the wall is cylindrical in configuration and the gas stream flows over the cylinder, with the liquid being supplied internally of the cylinder.

9. A nozzle as claimed in claim 6 in which the surface of the sintered metal is selectively closed by the machining portions of the surface thereof.

10. A nozzle as claimed in claim 9 in which the area selected for machining is chosen to suit the characteristic desired for evaporating a particular liquid into the gas stream.

11. A nozzle as claimed in claim 6 in which the sintered metal is bronze of a grain from two-and-a-half to five microns.

12. An engine management system which comprises a nozzle as claimed in any of claims 1, 2, and 4 to 11 including a compurter or microprocessor connected to sensors and programmed with fuel/air ratios to meet different conditions so as to deliver the correct signal to the thermoelectric device thereby giving the desired air to fuel ratio for the conditions sensed.

13. A system as claimed in claim 12 in which the computer has a read only memory (ROM) or equivalent containing a 'map' of the air to fuel ratio required for given values of the various parameters and compares the sensed values with the map held in memory and sends an appropriate signal to the thermoelectric device controller which responds by sending a current of the correct magnitude and polarity to the device such that the device, which is in close proximity to the wall heats or cools the surface of the wall to a desired level.

* * * * *